United States Patent [19]

Ive et al.

[11] 4,414,677
[45] Nov. 8, 1983

[54] SYNCHRONIZATION WORD EXTRACTOR

[75] Inventors: John G. S. Ive, London; Alan C. Thirlwall, Winchester, both of England

[73] Assignee: Sony Corporation, Tokyo, Japan

[21] Appl. No.: 317,179

[22] Filed: Nov. 2, 1981

[30] Foreign Application Priority Data

Nov. 18, 1980 [GB] United Kingdom ............... 8036935

[51] Int. Cl.³ .............................................. H04L 7/08
[52] U.S. Cl. .................................. 375/116; 340/146.2
[58] Field of Search ................... 375/106, 118, 116; 370/100; 371/42, 46, 47; 307/269; 340/146.2; 358/148, 153

[56] References Cited

U.S. PATENT DOCUMENTS 3,963,869 6/1976 Caldwell ..................... 370/100 X
4,012,598 3/1977 Wiley ............................. 375/118
4,353,130 10/1982 Carasso et al. ............. 375/118 X

*Primary Examiner*—Robert L. Griffin
*Assistant Examiner*—Albert W. Watkins
*Attorney, Agent, or Firm*—Lewis H. Eslinger; Alvin Sinderbrand

[57] ABSTRACT

Apparatus for extracting synchronizing information from an incoming serial-bit digital television signal formed of a sequence of data blocks, each block formed of N n-bit words and including within each block a predetermined serial group of m bits forming the synchronizing information, which identify each block of information and enable de-serialization of said signal. The apparatus comprises a first m-stage shift register through which the incoming digital signal is stepped at the bit rate of the incoming digital signal, and which supplies a pulse whenever it holds a predetermined serial group of m bits, a frequency divider to derive from the incoming digital signal a word rate clock pulse signal. Additionally, the apparatus comprises an n-stage shift register through which each said pulse is stepped at the bit rate of the incoming digital signal, a latch circuit synchronized with the word rate clock pulse signal to derive n-bit phase words the bits of which correspond respectively to the conditions of the n stages of the shift register, comparators comparing each phase word with at least one other phase word delayed N or an integral multiple of N word periods of an earlier incoming digital signal. Comparators supply a control signal only when at least one of the comparisons indicates two phase words which are identical and both contain a bit corresponding to a said pulse, wherein the position of this bit in the phase words indicates the phasing of the word rate clock pulse signal relative to the words of the incoming digital signal. In addition, circuits are provided to deserialize the incoming digital signal into parallel-bit n-bit words under control of the control signal.

13 Claims, 3 Drawing Figures

SYNCHRONIZATION WORD EXTRACTOR

BACKGROUND OF THE INVENTION

1. Field of the Invention

This invention relates to digital signal processing, and more particularly, but not exclusively, to apparatus for extracting synchronizing information from serial-bit digital television signals on reproduction from a digital video tape recorder (VTR), and for de-serializing the digital signals in dependence on the synchronizing information.

2. Description of the Prior Art

Almost irrespective of the way in which a television signal is processed and coded prior to recording on a digital VTR, the signal actually recorded is a serial-bit data stream comprising video data, error protection information, spare data capacity which may be used for example to record items such as dates, times and titles, and synchronizing information. The synchronizing information is crucial to recovering the data on reproduction. Thus whilst the VTR is synchronized to the system video, the mechanical tolerances of the VTR result in the timing on reproduction varying with respect to the system video. The reproduced synchronizing information is therefore essential to enable the reproduction processor to recover the data. On recovery, the data can be temporarily stored and read from the store in synchronism with the system video.

Moreover, because the data stream which is recorded and reproduced is in serial form and the reproduced data stream must be converted to parallel form in the reproduction processor, the synchronizing information is used to identify individual words in the reproduced serial data.

The recorded data stream is generally in the form of blocks of words, and in summary, therefore, on reproduction the synchronizing information is required to enable identification of the first bit of each word so as to permit de-serialization, and is also required to enable identification of the first word of each block of data words.

SUMMARY OF THE INVENTION

One object of the present invention is to provide apparatus for identifying the first bit of each word of a serial-bit digital television signal reproduced from a VTR.

Another object of the present invention is to provide apparatus for identifying the first word of each block of data words of a serial-bit digital television signal reproduced from a VTR.

Another object of the present invention is to provide apparatus for extracting synchronizing information from serial-bit digital television signals on reproduction from a digital VTR.

Another object of the present invention is to provide apparatus for extracting synchronising information from serial-bit digital television signals on reproduction from a digital VTR and for de-serializing the digital signals in dependence on the synchronizing information.

According to the present invention there is provided apparatus for extracting synchronizing information from an incoming serial-bit digital signal formed of a sequence of data blocks each block being formed of N n-bit words and each data block including a predetermined serial group of m bits forming said synchronizing information and for de-serializing said incoming digital signal in dependence on said synchronizing information, the apparatus comprising:

a first shift register arrangement including a first m-stage shift register through which said incoming digital signal is stepped at the bit rate of said incoming digital signal, said first shift register arrangement supplying a pulse when said first shift register holds said predetermined serial group of m bits;

means to derive from said incoming digital signal a word rate clock pulse signal;

a second shift register arrangement including a second n-stage shift register through which each said pulse is stepped at the bit rate of said incoming digital signal, and latch means synchronized with said word rate clock pulse signal to derive n-bit phase words the bits of which correspond respectively to the conditions of the n stages of said second shift register; comparator means for effectively comparing each said phase word with at least one other said phase word delayed N word periods or an integral multiple of N word periods of an earlier incoming digital signal; said comparator means supplying a control signal only when at least one of said comparisons indicates two phase words which are identical and both contain a bit corresponding to a said pulse, the position of said bit in said phase words indicating the phasing of said word rate clock pulse signal relative to the words of said incoming digital signal; and means to de-serialize said incoming digital signal into parallel-bit n-bit words under control of said control signal.

The above, and other objects, features and advantages of this invention will be apparent from the following detailed description of illustrative embodiments which is to be read in connection with the accompanying drawings.

BRIEF DESCRIPTION OF THE DRAWINGS

The invention will now be described by way of example with reference to the accompanying drawings, in which.

DESCRIPTION OF THE PREFERRED EMBODIMENTS

In the particular embodiment to be described, the invention is applied to reproduction of a PAL composite coded video signal from a digital VTR.

Figures 1, 2:
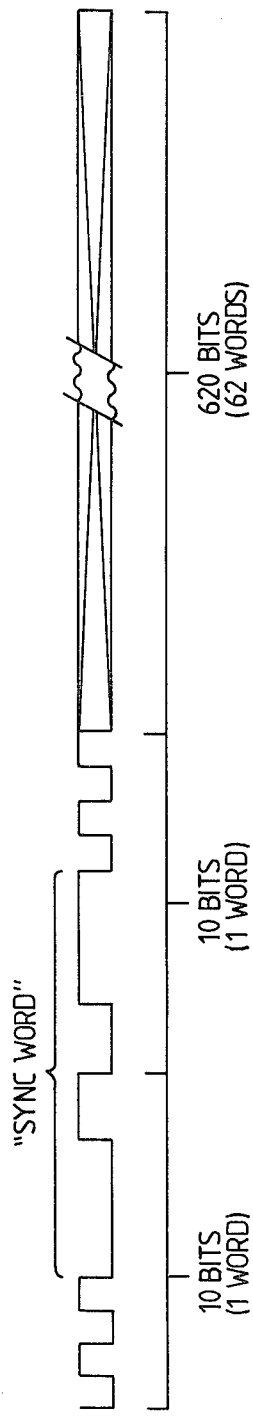
FIG. 1 shows the format in which data is recorded on a magnetic tape.
FIG. 2 shows part of the format in FIG. 1 in more detail.

Referring now to FIG. 1, this shows an example of the format used in recording the data which represents the composite coded video signal on the magnetic tape of a digital VTR. The data is made up of successive blocks of sixty-four 10-bit words. Numbering these words 1 to 64 they are allocated as follows:

| | |
|---|---|
| Words 1 and 2 | synchronizing information |
| Word 3 | line address |
| Word 4 | group identifier, eight field identifier and spare bits |
| Words 5 to 64 | video data |

The sixty video data words correspond to part of a horizontal line period. Each horizontal line of the television signal may be sampled at four hundred and eight points and each of the resulting samples is then coded to form a 10-bit word. In practice, this technique is modified in two ways. Firstly, each sample is first coded to form an 8-bit word, and each resulting 8-bit word is then converted to a 10-bit word in such a way as to reduce the dc components in the signal to be recorded on the magnetic tape by so far as reasonably possible equalizing and distributing the number of "0"s and "1"s to increase the transients and the clock frequency components. This results in a signal more suited to the recording characteristics of magnetic tape and moreover permits some measure of error detection and error correction to be applied to the reproduced video data, in addition to easier recovery of the clock frequency. Secondly, successive data words in each data block do not necessarily correspond to successive samples along a horizontal line. Thus if the successive samples making up a horizontal line or a field are scrambled in order prior to recording and then unscrambled on reproduction, then errors such as drop-out on reproduction from the magnetic tape will not result in loss of a continuous sequence of samples, but of individual samples distributed over a horizontal line or a field, and concealment techniques for concealing such errors are much more effective when applied to such individual samples, than when applied to continuous sequences of samples.

Referring to FIG. 2, this shows the words 1 and 2 of a data word group in more detail. Like the data words, the two synchronizing words 1 and 2 each consist of ten bits, although the actual synchronizing word is a 12-bit word symmetrically disposed spanning the words 1 and 2. The synchronizing word is in fact "000011001111" in this particular example, and generally if the words 1 to 64 are n-bit words the synchronizing word is an m-bit word where m is greater than or equal to n.

If the data were always reproduced prefectly from the digital VTR without errors, then it would be a comparatively simple matter to identify the synchronizing words and, having identified them, use them to deserialize the data to provide the data words in parallel form and to identify the first word of each data word block.

In practice, however, reproduction is generally somewhat less than perfect, so that the following factors need to be taken into consideration:
1. In the presence of errors, spurious synchronizing words may be detected.
2. Certain combinations of bits in the data words may form a synchronizing word.
3. In the presence of errors, synchronizing words may be missed completely.
4. Recovery from loss of synchronizing words must be as fast as possible, to avoid loss of data.

There is a further practical problem, and that is that at the data rates of 40 to 120 Megabits per second which necessarily have to be used for a digital television signal, complicated serial processing should be avoided if possible, because serial processing necessarily involves a greater power consumption and also necessitates use of comparatively low complexity devices which places constraints on the processing which can be done.

The embodiment to be described operates by searching the reproduced data for combinations of bits corresponding to the synchronizing words and spaced at sixty-four word intervals, that being the duration of a data word block and hence the expected interval between synchronizing words. Once a certain number of synchronizing words have been identified, which may be, for example, five synchronizing words, the system is locked. Having become locked, the system can be arranged to "free-wheel" over any short period during which successive synchronizing words are not identified. The embodiment contains delay elements, the operation of which has the effect of storing the incoming data while the search for synchronizing words is made, so there will generally be no loss of data during the search.

Figure 3:
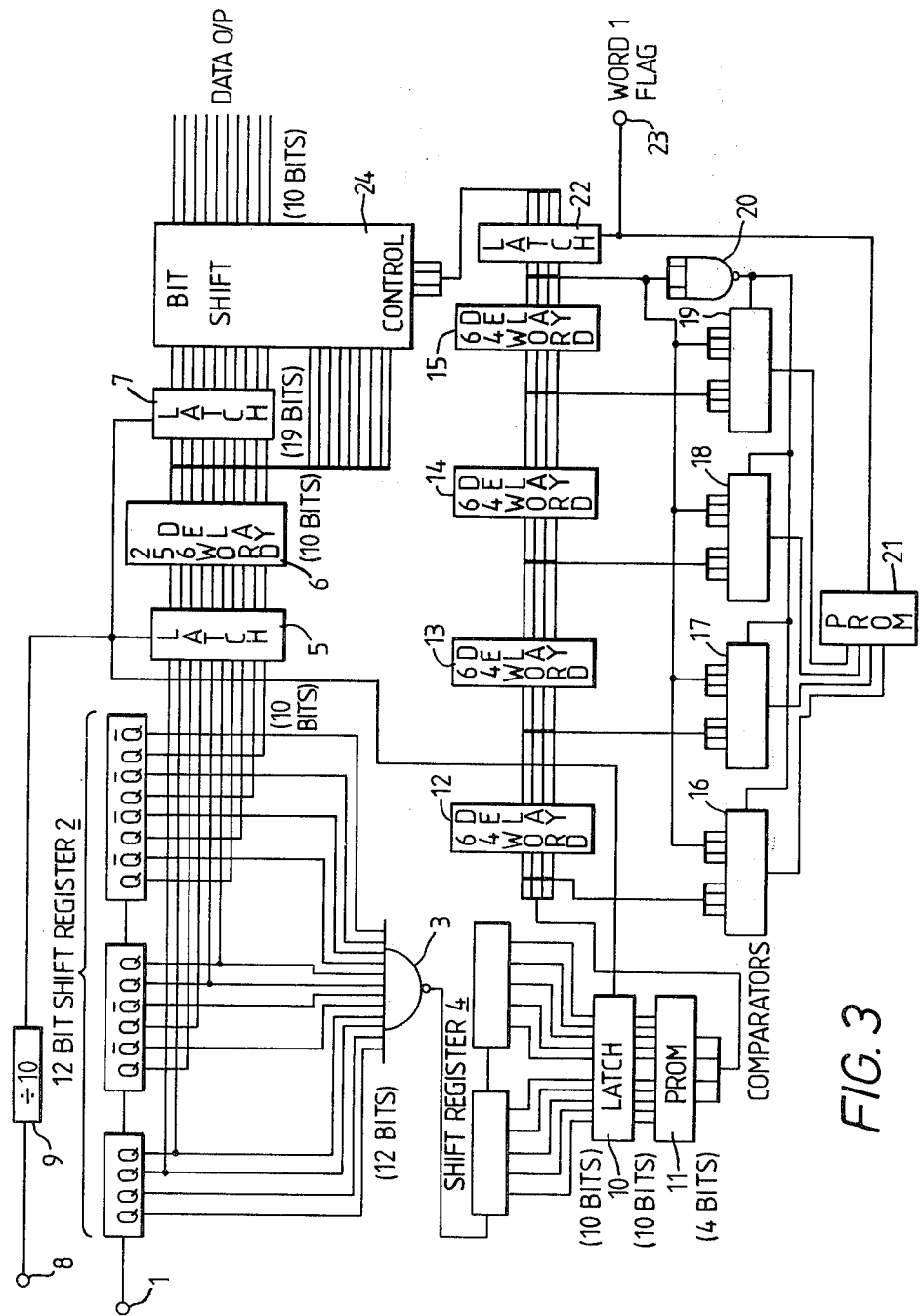
FIG. 3 shows a block form an embodiment of the invention.

The embodiment will now be described in detail with reference to FIG. 3. The serial data stream, which may for example have been reproduced by a digital VTR (not shown) is continuously supplied by way of an input terminal 1 to a 12-bit shift register 2. Each of the twelve stages of the shaft register has a true output Q, and certain stages, in particular the fifth, sixth, ninth, tenth, eleventh and twelfth also have inverse outputs $\bar{Q}$. Outputs are derived from the true outputs Q of the first to fourth, seventh and eighth stages and from the inverse outputs $\bar{Q}$ of the fifth, sixth, and ninth to twelfth stages of the shift register 2 for supply to the twelve inputs respectively of a NAND gate 3. This arrangement is such that when the shift register 2 is holding a synchronizing word "000011001111" a "1" will be supplied to each input of the NAND gate 3 which will thereupon supply a single pulse of a logical level 0 having a one bit duration. The pulses from the NAND gate 3 are clocked into a 10-bit shift register 4.

In practice, a commonly available NAND gate usable as the NAND gate 3 may have thirteen inputs, in which case the bit immediately preceding the synchronizing word, which as seen in FIG. 2 is always "1" may be derived by a latch circuit (not shown) and supplied to the thirteenth input. This does not affect the principle of the operation.

As the reproduced serial data stream continues to be supplied to the shift register 2 at the serial bit rate, the shift register 2 will, subsequent to containing a synchronizing word, contain the video data words which require de-serialization. The true outputs Q of the third to twelfth stages of the shift register 2 are respectively connected to the ten inputs of a latch circuit 5. The ten outputs of the latch circuit 5 are connected by way of a 256-word-period delay device 6 to the ten inputs respectively of a latch circuit 7.

A serial bit clock pulse signal is derived from the reproduced serial stream of data and is supplied to a further input terminal 8 which is connected to a frequency divider 9 where the frequency of the serial bit clock pulse signal is divided by ten to produce an output clock pulse signal at the data word rate. De-serialization is achieved under control of the resulting word rate clock pulse signal which is supplied to the latch circuits 5 and 7. Briefly, this is achieved by transfer of the data from the input to the output of the latch circuit 5 during one bit period of the serial data stream. The output of the latch circuit 5 is then held for the next nine serial bit rate clock pulses. In other words, the output of the latch circuit 5 is maintained for the period of one word rate clock pulse. It will be realized that this de-serialization is random, in that it could set in any one of the ten possible phases relative to the bits of the data words, but any resulting error is corrected subsequently by bit shifting, as will be described in more detail below.

Returning now to the 10-bit shift register 4, it will be recalled that a pulse is supplied thereto by the NAND gate 3 when a synchronizing word is held in the 12-bit shift register 2. The shift register 4 is stepped at the serial bit rate and in consequence the "0" resulting from the pulse supplied from the NAND gate 3 will be stepped through (and out of) the stages of the shift register 4 at the serial bit rate. Each stage of the shift register 4 has an output connected to a respective one of the ten inputs of a latch circuit 10. The latch circuit 10 is also supplied with the word rate clock pulse signal from the frequency divider 9, so at intervals corresponding to the period of one data word, the 10-bit output of the shift register 4 will be latched in the latch circuit 10 and held for supply to a programmable read-only memory (PROM) 11.

Assuming that at some time during this interval a synchronizing word has been held in the shift register 2, the ten bits held in the latch circuit 10 will comprise nine "1"s and one "0", and the position of the "0" in these ten bits will indicate the require phase of the deserialization of the incoming data words. The PROM 11 operates to binary code the ten possible phases into a 4-bit binary coded decimal number in the range 0 to 9. If no synchronizing word has been held in the shift register 2 in the relevant interval, then there will be no "0" in the ten bits held by the latch circuit 10 and supplied to the PROM 11, and in that case the PROM 11 supplies a code of "1111" (corresponding to 15 or F).

The 4-bit code words supplied by the PROM 11 are supplied to four series-connected 64-word-period delay devices 12, 13, 14 and 15, so that at any given time five code words are available simultaneously for comparison. The sum of the delays in the delay devices 12 to 15 is two hundred and fifty-six word periods, and it is for this reason that the incoming data is likewise delayed by two hundred and fifty-six word periods in the delay device 6, so that no data is lost while the comparison of the code words is carried out.

Four comparators 16, 17, 18 and 19 are provided, each capable of comparing a respective pair of 4-bit code words. At any given time a first code word is supplied from the output of the delay device 15 to each of the comparators 16 to 19. The comparator 19 operates to compare the first code word with a second code word supplied from the output of the delay device 14. The comparator 18 operates to compare the first code word with a third word supplied from the output of the delay device 13. A comparator 17 operates to compare the first word with a fourth code word supplied from the output of the delay device 12. The comparator 16 operates to compare the first code word with a fifth code word supplied from the output of the PROM 11. A NAND gate 20 is arranged to indicate an invalid comparison if the code word supplied thereto is "F". Normally, of course, invalidation will occur in sixty-three out of every sixty-four word periods.

Each comparator 16 to 19 has an output which is connected to a respective one of the four inputs of a PROM 21. The PROM 21 is programmed to evaluate the outputs of the comparators 16 to 19, the precise form of this evaluation being referred to in greater detail below. When a satisfactory evaluation is achieved, the PROM 21 supplies a data start pulse at its output, this data start pulse being supplied to a latch circuit 22 and also to an output terminal 23 as a word 1 flag.

Although the code words can assume any value 0 to 9 (and F), it is normally to be expected that with valid input data, one of these numbers will quickly become established and will continue until, for example, a large drop-out occurs, which will interrupt the operation of the frequency divider 9. Once the drop-out has passed, however, the number will be become reestablished, or possibly a different number will become established.

It is therefore justifiable to look for equality in the five code words which are being compared in the comparators 16 to 19, although it is possible to program the PROM 21 to check for other combinations.

For example:

1. All four of the comparators 16 to 19 show equality.

For this to occur five synchronizing words in sequence must be represented by the same code number. To program the PROM 21 for this makes the system very robust against spurious synchronizing words, but there is a possible disadvantage that there may be poor detection, that is to say the system may be slow to lock-in, due to the necessity of five synchronizing words in sequence all being correct and not influenced by errors. Thus, if one synchronizing words is in error, this means that five data starts pulses will be lost, as the code word corresponding to the synchronizing word which is in error propagates down the delay devices 12 to 15. However, only a fraction of one data word block will be lost, due to the compensating delay in the delay device 6.

2. Three out of four of the comparators 16 to 19 show equality.

If the PROM 21 is programmed for this, there will be some reduction in the ability to ignore spurious synchronizing words, although this may perhaps be compensated by the fact that only one data start pulse is lost when one synchronizing word is in error. This loss will occur when the corresponding code word is present at the output of the final delay device 15, as only then will be supplied to all four of the comparators 16 to 19.

3. One out of four of the comparators 16 to 19 shows equality.

This represents the other extreme of the possible programs for the PROM 21. In this case, the data start pulses will still be generated regularly in the presence of errors, but the system will be very vulnerable to spurious code words resulting from errors in the synchronizing words.

For the reasons outlined above, the first of these programming possibilities will generally be selected. Thus, when all of the comparators 16 to 19 supply signals to the PROM 21 indicating equality, the PROM will supply a data start pulse to the output terminal 23 and also to the latch circuit 22. The latch circuit 22 will therefore latch the first code word then being supplied by the delay circuit 15, and supply this code word as a control to a bit shift device 24. The code word, it will be recalled, represents one of ten phase positions in the form of a decimal number in the range 0 to 9. The bit shift device 24 has nineteen inputs. Ten of these inputs are respectively connected to the ten outputs of the latch circuit 7, and the remaining 9 are connected to respective outputs of the delay device 6. At any time, therefore, nineteen successive bits from the serial bit input data are being supplied to respective inputs of the bit shift device 24 and at all times one complete 10-bit word must be present in these bits. The code word supplied to the bit shaft device 24 from the latch circuit 22 indicates how the nineteen bits must be framed in order to gate out the ten bits corresponding to a word, the bit shift device 24 having ten outputs over which these ten bits are respectively supplied.

In the event that data start pulses are lost, the last framing position of the bit shift device 24 is stored. It has been proved experimentally that using the first program option mentioned above for the PROM 21, that is all the comparators 16 to 19 showing equality, this results in an optimum solution. The presence of short term errors in the incoming data, which are statistically more frequent that long drop-outs, corrupts the synchronizing words by reversing bits, but does not upset the recovered clock pulse signal. The system can therefore "free-wheel" over these disturbances.

Finally, the data start pulse which is supplied to the output terminal 23 is used to identify the first word of data, that is the word 5 in each data word block, so as to synchronize the storage of the data in a stabilizing store which forms part of a time-base corrector.

As a modification, a greater or smaller number of comparators may be used. Moreover, the incoming digital signal need not be a PAL digital television signal, but may be an NTSC digital television signal or some other digital signal consisting of successive blocks of N n-bit words, each data block containing m serial bits forming the synchronizing information.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention was defined by the appended claims.

We claim:

1. Apparatus for extracting synchronizing information from an incoming serial-bit digital signal, said signal forming a sequence of data blocks each of which has N n-bit words and a predetermined serial group of m bits forming said synchronizing information, said synchronizing information identifying each block of data, the apparatus comprising:
    a first shift register arrangement including a first m-stage shift register through which said incoming digital signal is stepped at the bit rate of said incoming digital signal, said first shift register arrangement supplying a pulse when said first shift register holds said predetermined serial group of m bits;
    means to derive from said incoming digital signal a word rate clock pulse signal;
    a second shift register arrangement including a second n-stage shift register through which each pulse supplied by said first shift register is stepped at the bit rate of said incoming digital signal, and latch means synchronized with said word rate clock pulse signal to derive n-bit phase words, the bits of which correspond respectively to the conditions of the n stages of said second shift register;
    comparator means for effectively comparing each phase word with at least one other phase word delayed by N word periods or a integral multiple of N word periods of an earlier incoming digital signal;
    said comparator means supplying a control signal only when at least one of said comparisons indicates two phase words which are identical and both contain a bit corresponding to a said pulse, the position of said bit in said phase words indicating the phasing of said word rate clock pulse signal relative to the words of said incoming digital signals; and
    means to de-serialize said incoming digital signal into parallel-bit n-bit words under control of said control signal.

2. Apparatus according to claim 1 wherein said second shift register arrangement further includes a programmable read-only memory for coding said n-bit phase words into respective binary code words each representing a decimal number indicating the position of said bit in said phase word, or if there is no said bit, the absence of any said bit in said phase word; and wherein said comparator means compares said code words.

3. Apparatus according to claim 2 wherein said comparator means comprises a plurality of comparators each able to compare two said code words and first delay means for respectively delaying a like plurality of said code words by N, 2N, 3N, ... word periods respectively of said incoming digital signal.

4. Apparatus according to claim 3 wherein said plurality is equal to four.

5. Apparatus according to claim 3 wherein said comparator means further comprises evaluation means for evaluating the results of the comparison effected by said plurality of comparators and for supplying said control signal only when all of said comparators indicate two code words which are identical and correspond to a phase word containing a bit corresponding to a said pulse.

6. Apparatus according to claim 5 wherein said evaluation means is a further programmable read-only memory.

7. Apparatus according to claim 1 wherein said first shift register has m outputs coupled to the m stages respectively, some of said outputs being true outputs and the remainder being inverse outputs, and the arrangement being such that when said first shift register holds said predetermined serial group of m bits each one of said outputs is supplied with a similar signal.

8. Apparatus according to claim 7 wherein said outputs of said first shift register are respectively connected to the inputs of an m-input NAND gate, which supplies said pulse.

9. Apparatus according to claim 3 wherein said means to de-serialize said incoming digital signal comprises a first n-input latch circuit the inputs of which are respectively coupled to n of the m stages of said shift register where m is greater than or equal to n, second delay means coupled to the outputs of said first latch circuit for effecting a delay equal to the maximum delay of said first delay means, means for deriving from the output of said second delay means $2n-1$ bits in parallel and corresponding to $2n-1$ serial bits of said incoming digital signal, and means to select from said $2n-1$ bits under control of said control signal the n bits forming one said word.

10. Apparatus according to claim 1 wherein said incoming digital signal is a digital television signal.

11. Apparatus according to claim 1 wherein n is ten.

12. Apparatus according to claim 11 wherein m is twelve.

13. Apparatus according to claim 12 wherein N is sixty-four.

* * * * *